(12) United States Patent
Wang et al.

(10) Patent No.: US 11,314,334 B2
(45) Date of Patent: Apr. 26, 2022

(54) GESTURE RECOGNITION APPARATUS, CONTROL METHOD THEREOF, AND DISPLAY APPARATUS

(71) Applicant: BOE Technology Group Co., Ltd., Beijing (CN)

(72) Inventors: Pengpeng Wang, Beijing (CN); Haisheng Wang, Beijing (CN); Xiaoliang Ding, Beijing (CN); Xueyou Cao, Beijing (CN); Ping Zhang, Beijing (CN); Wei Liu, Beijing (CN); Likai Deng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 313 days.

(21) Appl. No.: 16/346,943

(22) PCT Filed: Aug. 27, 2018

(86) PCT No.: PCT/CN2018/102502
§ 371 (c)(1),
(2) Date: May 2, 2019

(87) PCT Pub. No.: WO2019/218521
PCT Pub. Date: Nov. 21, 2019

(65) Prior Publication Data
US 2021/0294421 A1   Sep. 23, 2021

(30) Foreign Application Priority Data
May 14, 2018 (CN) .......................... 201810455725.8

(51) Int. Cl.
*H04N 13/204* (2018.01)
*G06F 3/01* (2006.01)
*G06K 9/00* (2022.01)

(52) U.S. Cl.
CPC ......... *G06F 3/017* (2013.01); *G06K 9/00355* (2013.01); *H04N 13/204* (2018.05)

(58) Field of Classification Search
None
See application file for complete search history.

(56) References Cited

U.S. PATENT DOCUMENTS

| 9,118,782 B1* | 8/2015 | Coley .................. H04N 5/00 |
| 2011/0188845 A1* | 8/2011 | Hanayama ........... H04N 5/2354 396/155 |

(Continued)

FOREIGN PATENT DOCUMENTS

| CN | 101793516 A | 8/2010 |
| CN | 103425357 A | 12/2013 |

(Continued)

OTHER PUBLICATIONS

Office Action dated Mar. 31, 2020, issued in counterpart CN Application No. 201810455725.8, with English translation (30 pages).

(Continued)

*Primary Examiner* — Tuan S Nguyen
(74) *Attorney, Agent, or Firm* — WHDA, LLP

(57) ABSTRACT

The present disclosure relates to a gesture recognition apparatus. The gesture recognition apparatus may include a gesture processor and a plurality of depth cameras connecting to the gesture processor. Each of the plurality of the depth cameras may include a controller and a collector. The controller may be configured to generate and transmit an acquisition signal to the collector in response to a trigger signal. The collector may be configured to receive the acquisition signal and perform an image acquisition process in response to the acquisition signal.

16 Claims, 17 Drawing Sheets

Sending an acquisition signal by controllers of at least two depth cameras respectively at different times —— S101

Receiving the acquisition signal and performing an image acquisition process by collectors of the at least two depth cameras respectively —— S102

(56) References Cited

U.S. PATENT DOCUMENTS

| | | | |
|---|---|---|---|
| 2013/0066526 A1* | 3/2013 | Mondragon | G06F 3/017 |
| | | | 701/48 |
| 2014/0168372 A1 | 6/2014 | Chang et al. | |
| 2015/0365652 A1 | 12/2015 | Liu et al. | |
| 2017/0099422 A1* | 4/2017 | Goma | H04N 5/369 |
| 2017/0187457 A1* | 6/2017 | Liu | H04B 10/116 |
| 2017/0244938 A1* | 8/2017 | Al Mohizea | G06T 5/003 |

FOREIGN PATENT DOCUMENTS

| | | | |
|---|---|---|---|
| CN | 106598235 A | 4/2017 | |
| CN | 107105093 A | 8/2017 | |
| CN | 107145822 A | 9/2017 | |
| CN | 107493428 A | 12/2017 | |
| CN | 107589845 A | 1/2018 | |

OTHER PUBLICATIONS

International Search Report dated Feb. 14, 2019, issued in counterpart Application No. PCT/CN2018/102502 (10 pages).

Office Action dated Oct. 19, 2020, issued in counterpart CN Application No. 201810455725.8, with English Translation. (30 pages).

* cited by examiner

GESTURE RECOGNITION APPARATUS, CONTROL METHOD THEREOF, AND DISPLAY APPARATUS

CROSS-REFERENCE TO RELATED APPLICATIONS

This application claims benefit of the filing date of Chinese Patent Application No. 201810455725.8 filed on May 14, 2018, the disclosure of which is hereby incorporated in its entirety by reference.

TECHNICAL FIELD

The present disclosure relates to display technologies, and in particular, to a gesture recognition apparatus, a control method thereof, and a display apparatus.

BACKGROUND

At present, gesture interaction uses computer graphics and other techniques to identify a person's body language, and converts the above body language into a control command for operating an apparatus. Gesture interaction is a new type of human-computer interaction after the mouse, keyboard and touch screen.

During a process of gesture interaction, a user's gesture needs to be acquired and a control command matching the gesture is called upon based on the acquired gesture. In the process of acquiring the gesture, in order to avoid blind spots, a plurality of cameras is usually used to acquire the gesture. However, during the acquisition process using the plurality of cameras, interference among the cameras is likely to occur, thereby resulting in a decrease in acquisition accuracy.

BRIEF SUMMARY

An example of the present disclosure provides a gesture recognition apparatus. The gesture recognition apparatus may include a gesture processor and a plurality of depth cameras connecting to the gesture processor. Each of the plurality of the depth cameras may include a controller and a collector. The controller may be configured to generate and transmit an acquisition signal to the collector in response to a trigger signal. The collector may be configured to receive the acquisition signal and perform an image acquisition process in response to the acquisition signal.

At least one of the plurality of depth cameras may further include an optical trigger. The optical trigger may be electrically coupled to the controller, and the optical trigger may be configured to generate and transmit the trigger signal to the controller in response to an optical signal.

The optical trigger may include a photoelectric converter. The at least one of the plurality of depth cameras having the optical trigger may further include a current-voltage converter. The current-voltage converter may be electrically coupled to the optical trigger and the controller, and the current-voltage converter may be configured to convert a current signal from the photoelectric converter into a voltage signal and transmit the voltage signal to the controller.

The at least one of the plurality of depth cameras having the optical trigger may further include a filter shaper and a phase compensator. The filter shaper may be electrically coupled to the current-voltage converter and the filter shaper may be configured to filter the voltage signal from the current-voltage converter. The phase compensator may be electrically coupled to the filter shaper and the controller, and the phase compensator may be configured to compensate a phase of the voltage signal from the filter shaper to obtain a compensated voltage signal and output the compensated voltage signal to the controller.

Each of the plurality of depth cameras may further include a light-emitting element. The controller may include a light control element. The light control element may be configured to generate a light-emitting signal in response to the trigger signal. The light-emitting element may be electrically coupled to the light control element, and the light-emitting element may be configured to emit a light signal in response to the light-emitting signal. The light signal may be reflected by an object to be imaged to produce a reflected light signal.

The controller may further include a counter. The counter may be electrically coupled to the light control element and the counter may be configured to start counting after receiving the trigger signal, and trigger the light control component to transmit the light-emitting signal to the light-emitting element when a count value of the counter reaches a first threshold.

The controller may further include a signal generator. The counter may be further electrically coupled to the signal generator. The signal generator may be configured to generate the acquisition signal. The counter may be further configured to trigger the signal generator to transmit the acquisition signal to the collector when the count value of the counter reaches the first threshold.

The first threshold in each of the plurality of depth cameras may be different. For any two adjacent depth cameras, the counter in one of the two adjacent depth cameras may reach the first threshold after the other one of the two adjacent depth cameras completes the image acquisition process.

The collector may include a photosensitive array and a readout element. The photosensitive array may include a plurality of photosensitive pixels arranged in a matrix. The photosensitive array may be electrically coupled to the controller and the plurality of photosensitive pixels may be configured to receive the reflected light signal in response to the acquisition signal and perform photoelectric conversion of the reflected optical signal. The readout element may be electrically coupled to the controller and the photosensitive array, and the readout element may be configured to demodulate the reflected light signal in response to the acquisition signal, and acquire signal difference information between the light signal and the reflected light signal.

Each of the plurality of the depth cameras may further include a calculator. The calculator may be electrically coupled to the readout element, and the calculator may be configured to calculate image depth information obtained by each of the photosensitive pixels based on the signal difference information from the readout element.

In one embodiment, each of the plurality of depth cameras may include the optical trigger. The gesture recognition apparatus may further include a trigger light source. The trigger lighter source may be configured to emit the optical signal to the optical trigger in each of the plurality of depth cameras. The optical trigger of at least one of the plurality of depth cameras may receive the reflected light signal and generates and transmits the trigger signal to the controller in response to the reflected light signal.

The counter may be further electrically coupled to the readout element. At least one of the plurality of photosensitive pixels in the photosensitive array may be configured to receive the reflected light signal, and convert the reflected light signal into an electrical signal. The readout element may be configured to receive the electrical signal, and generate and transmit the trigger signal to the counter in response to the electrical signal.

The light-emitting element may include a light emitting diode, the light control element may include a light modulator, and the light-emitting element may be configured to emit a pulse light signal in response to the light-emitting signal. The light-emitting element may include a plurality of light emitting diodes arranged in an array, the light control element may include a coding pattern driving element, and the light-emitting element may be configured to emit a coding pattern signal in response to the light-emitting signal.

The controller in at least one of the plurality of depth cameras may be configured to receive the trigger signal input by a user. The gesture recognition apparatus may further include a light-emitting element. The controller may be configured to generate, and transmit a light-emitting signal to the light-emitting element in response to the trigger signal, and the light-emitting element may be configured to emit a light signal in response to the light-emitting signal. The light signal being reflected by an object to be imaged may produce a reflected light signal.

The controller may include a counter, a light control element, and a signal generator. The collector may include a photosensitive array comprising a plurality of photosensitive pixels arranged in a matrix and a readout element. The readout element may be electrically coupled to the counter. At least one of the plurality of photosensitive pixels in the photosensitive array may be configured to receive the reflected light signal, and convert the reflected light signal into an electrical signal. The readout element may be configured to receive the electrical signal, and generate and transmit the trigger signal to the counter in response to the electrical signal.

Another example of the present disclosure is a display apparatus comprising the gesture recognition apparatus according to one of the present disclosure.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Obviously, the drawings in the following description are only certain embodiments of the present disclosure, and other drawings can be obtained from those skilled in the art without any creative work.

DETAILED DESCRIPTION

Figure 1:
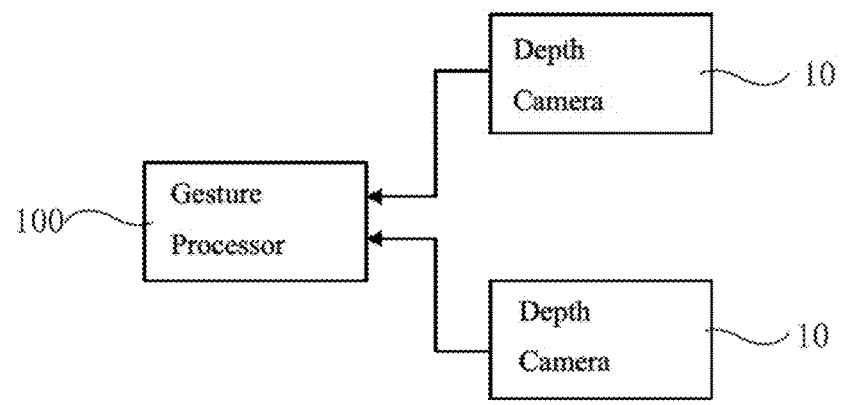
FIG. 1 is a schematic structural diagram of a gesture recognition apparatus according to one embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-14. When referring to the figures, like structures and elements shown throughout are indicated with like reference numerals.

Hereinafter, in the description of the embodiments of the present application, the meaning of "a plurality" is two or more unless otherwise stated.

One embodiment, of the present disclosure provides a gesture recognition apparatus 01. As shown in FIG. 1, the gesture recognition apparatus 01 includes a gesture processor 100 and a plurality of depth cameras 10 connected to the gesture processor 100. The depth camera 10 can acquire a user's gesture and transmit the acquired information to the gesture processor 100. The gesture processor 100 can process the acquired information of the depth cameras 10, obtain characteristic information of the acquired gesture, and compare to pre-stored preset gestures to achieve the gesture recognition. In one embodiment, both the mobile phone and the TV platform can use the arm core processor or a separate customized IC as a gesture processor to implement the gesture processing function.

Figure 2:
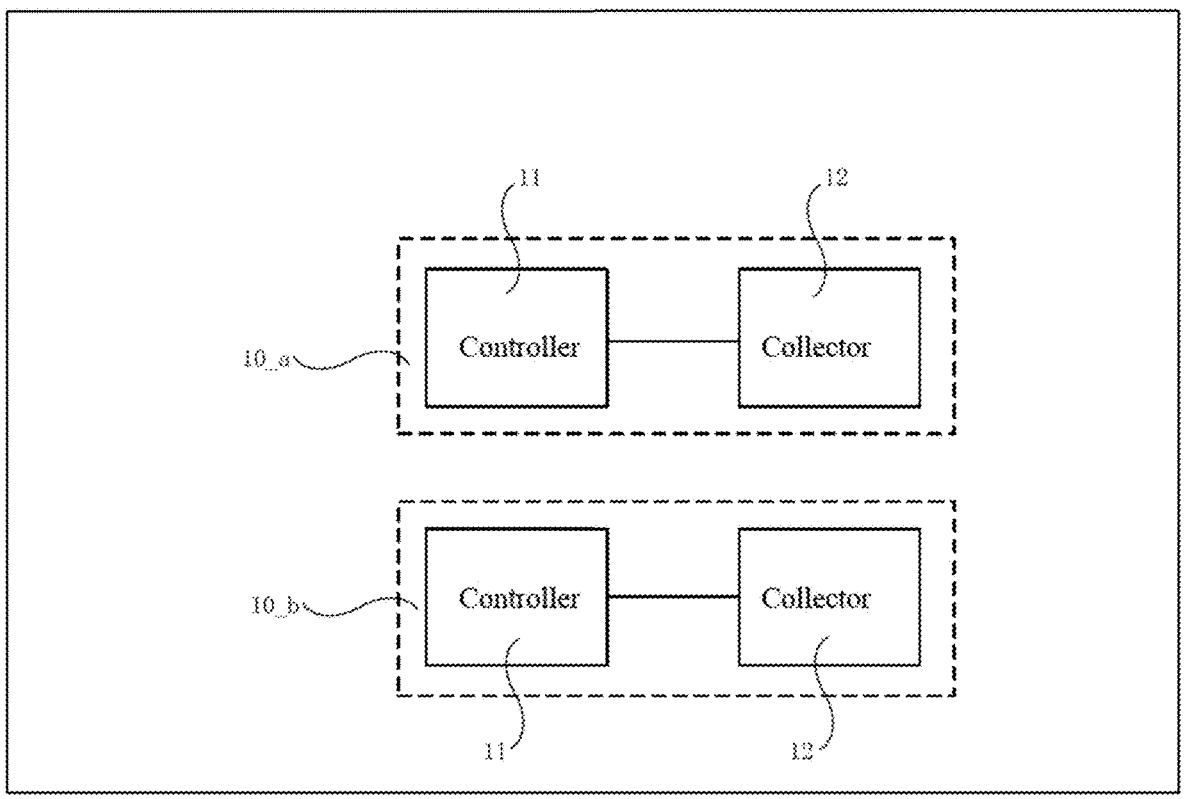
FIG. 2 is a schematic structural view of a depth camera in the gesture recognition apparatus according to one embodiment of the present disclosure.

In one embodiment, as shown in FIG. 2, each depth camera 10 includes a controller 11 and a collector 12.

In one embodiment, the controller 11 is configured to generate an acquisition signal in response to a trigger signal and control the time when the acquisition signal is transmitted.

The collector 12 is electrically coupled to the controller 11, and the collector 12 is configured to receive the above-mentioned acquisition signal and perform an image acquisition process in response to the acquisition signal.

In summary, in one aspect, the gesture recognition apparatus 01 provided by one embodiment of the present disclosure includes a plurality of depth cameras 10. The controller 11 in the depth camera 10 is capable of generating an acquisition signal for controlling acquisition of the image by the collector 12 in response to a trigger signal. In addition, the controller 11 can also control the time when the acquisition signal is transmitted. In this way, the controllers 11 of the plurality of depth cameras 10 can transmit the acquisition signals to the collectors 12 of the respective depth cameras 10 at different times, that is, the times when the controllers 11 of different depth cameras 10 respectively transmit the acquisition signals are different.

Figure 3:
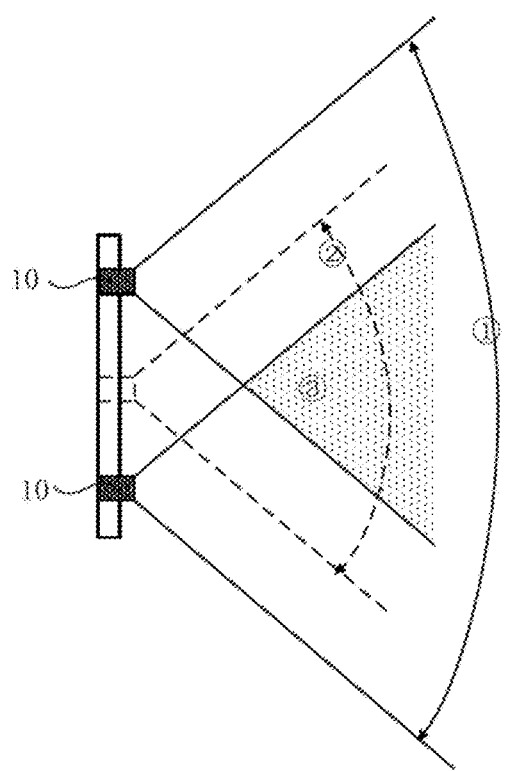
FIG. 3 is a schematic diagram of an acquisition range of two depth cameras according to one embodiment of the present disclosure.

In one embodiment, as shown in FIG. 2, the above gesture recognition apparatus includes two depth cameras, a depth camera 10_a and a depth camera 10_b. After the controller 11 in the depth camera 10_a sends an acquisition signal to the collector 12 in the depth camera 10_a and the collector 12 completes the image, acquisition process, the controller 11 in the depth camera 10_b transmits the acquisition signal to the collector 12 in the depth camera 10_b. At this time, the depth camera 10_a has completed the illumination and image acquisition processes. As such, the light emitted by the depth camera 10_a does not cause interference when the collector 12 of the depth camera 10_b acquires the image, thereby improving accuracy of the gesture acquisition. Furthermore, since the gesture recognition apparatus 01 according to one embodiment of the present disclosure includes a plurality of depth cameras 10, as shown in FIG. 3, the acquisition range 1 obtained by the plurality of depth cameras 10 (for example, two cameras) is obviously larger comparing to the acquisition range 2 obtained by only one camera (shown by a broken line in FIG. 3). As such, the range for the user's gesture activities is expanded and probability of presence of acquisition blind zone is decreased. Furthermore, the acquisition ranges of the plurality of depth cameras 10 have an overlapping portion 3. When at least a part of the gesture of the user is located in the overlapping portion 3, the images acquired by the two depth cameras 10 in the overlapping portion 3 can be spliced based on relative positional relationship of the plurality of depth cameras 10 to ensure correctness of the gesture acquisition.

As can be seen from the above, the controller 11 generates and transmits the acquisition signal only after receiving the trigger signal. The trigger signal may be input by a user, or may be sent by a user through controlling a trigger source. The exemplar configuration of the depth camera 10 having a trigger source capable of transmitting the above-described trigger signal will be described in detail below.

Figure 4:
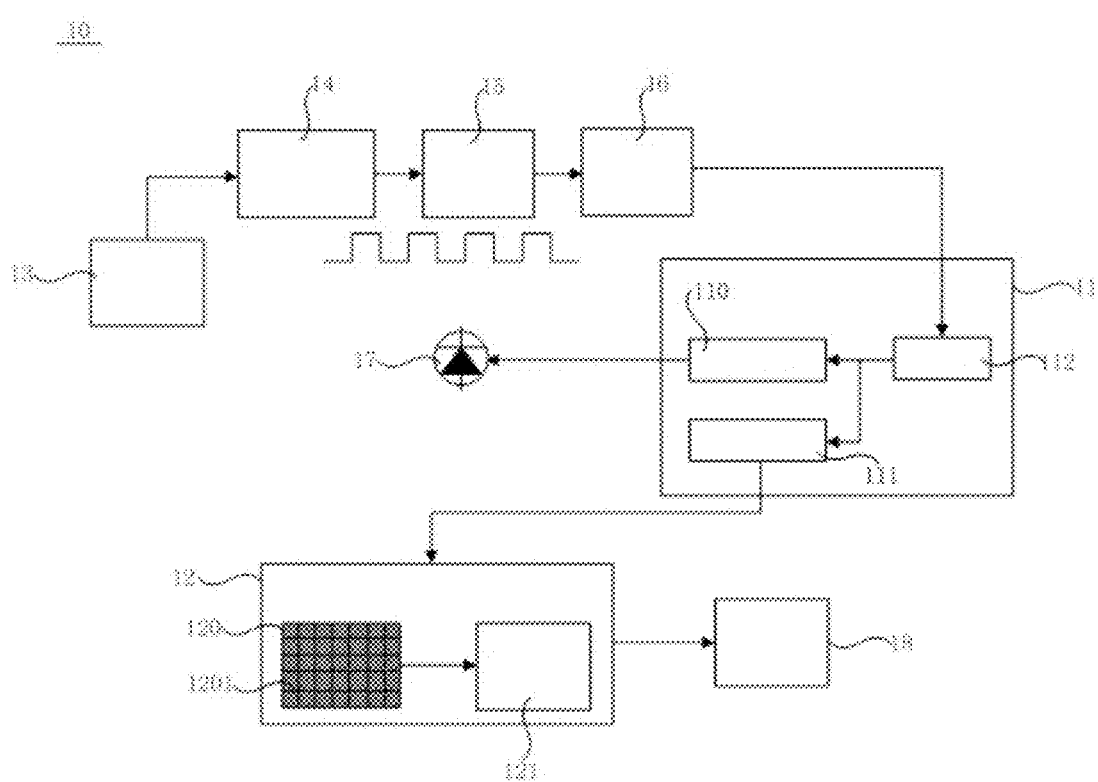
FIG. 4 is a schematic structural view of a depth camera in the gesture recognition apparatus according to one embodiment of the present disclosure.

In one embodiment, at least one depth camera 10 of the above gesture recognition apparatus 01, as shown in FIG. 4, includes an optical trigger 13. The optical trigger 13 may include a photoelectric converter such as a photodiode. In this case, after receiving an optical signal, the optical trigger 13 can convert the optical signal into a current signal through photoelectric conversion.

In the embodiment, the optical trigger 13 is electrically coupled to the controller 11, and the optical trigger 13 is configured to receive an optical signal and transmit the trigger signal to the controller 11 in response to the optical signal. The optical trigger 13 is the trigger source for emitting a trigger signal. The user can control the timing of transmitting the above optical signal to control the timing when the optical trigger 13 transmits the trigger signal.

In one embodiment, as shown in FIG. 4, the depth camera 10 having the optical trigger 13 further includes a current-voltage converter 14, which is electrically coupled to the optical trigger 13 and the controller 11. When the photoelectric converter in the optical trigger 13 converts the received optical signal into a current signal, the current-voltage converter 14 can convert the current signal into a voltage signal and transmit the voltage to the controller 11.

After the current-voltage conversion is performed by the current-voltage converter 14, in order to reduce probability of waveform distortion of the converted voltage signal, optionally, as shown in FIG. 4, the depth camera 10 having the optical trigger 13 further includes a filter shaper 15 and a phase compensator 16.

Wherein, the filter shaper 15 is electrically coupled to the current-voltage converter 14 for filtering the voltage signal from the current-voltage converter 14 to reduce noise of the voltage signal from the current-voltage converter 14.

In addition, the phase compensator 16 is electrically coupled to the filter shaper 15 and the controller 11. The phase compensator 16 is configured to compensate the phase of the voltage signal from the filter shaper 15 and output the compensated voltage signal to the controller 11. In this way, when the waveform of the voltage signal converted by the current-voltage converter 14 is affected by the conversion accuracy, and the phase of the partial waveform changes, the phase compensator 16 can compensate for the phase change to ensure integrity and correctness of the voltage signal after conversion.

Figure 5:
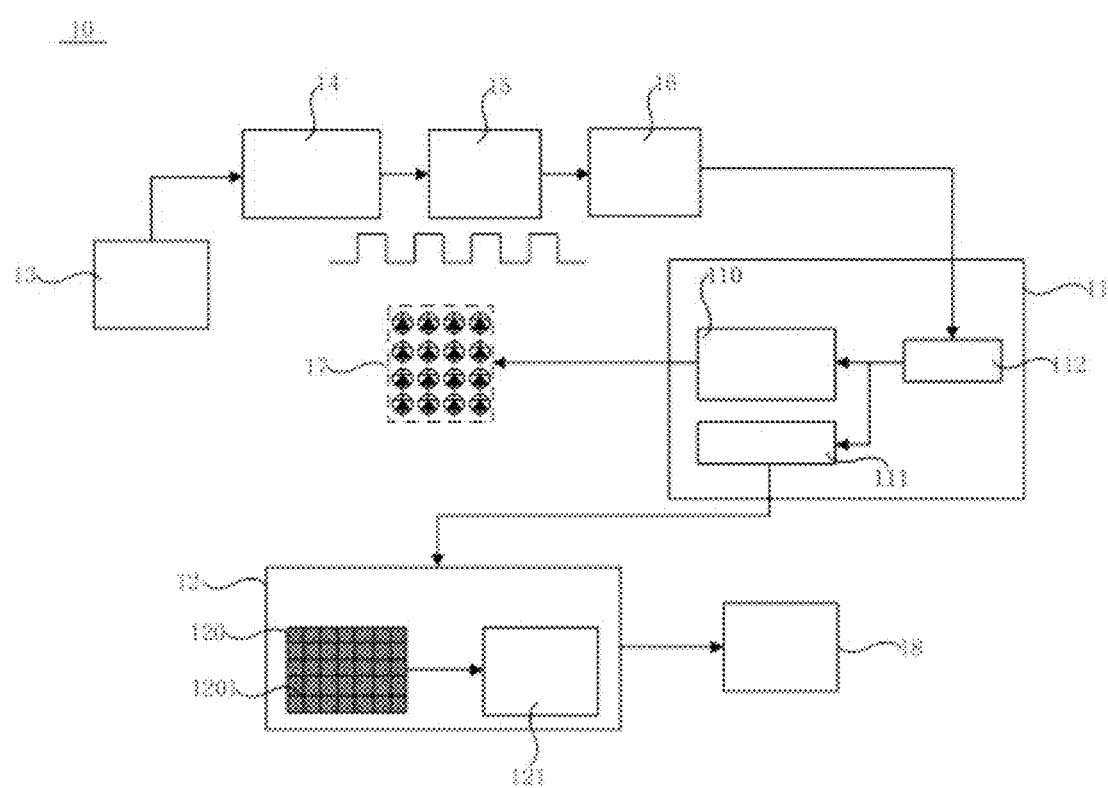
FIG. 5 is a schematic structural diagram of a depth camera in the gesture recognition apparatus according to one embodiment of the present disclosure.

In one embodiment, as shown in FIG. 4 or FIG. 5, the depth camera 10 further includes a light-emitting element 17.

In the embodiment, the controller 11 includes a light control element 110. The light control element 110 is configured to generate a light-emitting signal in response to the trigger signal.

In this case, the light-emitting element 17 is electrically coupled to the light-control element 110, and the light-emitting element 17 is used to emit a preset light signal in response to the light-emitting signal. The preset light signal is incident on the object being imaged.

The exemplified structure of the above-described light-emitting element 17 and the light-control element 110 will be described in detail below.

In one embodiment, as shown in FIG. 4, the light-emitting element 17 includes a light-emitting diode. At this time, the light control element 110 includes a light modulator. Under the modulation of the light modulator, the light-emitting diode can be controlled to emit a pulse light signal having a certain period such as a sinusoidal. As such, the preset light signal is the pulse light signal. In this case, the depth camera 10 having the light-emitting element 17 and the light control element 110 is a Time of Flight (TOF) camera.

In one embodiment, as shown in FIG. 5, the light-emitting element 17 includes a plurality of light-emitting diodes arranged in an array. At this time, the light control element 110 includes a code pattern driving element. Different coding patterns can be stored in the coding pattern driving element according to a user's need. After, the light-emitting component 17 receives the coding pattern, some of the plurality of LEDs arranged in an array are controlled to emit light, and some of the plurality of LEDs are turned off. Thus, the plurality of light-emitting diodes arranged in the array is capable of displaying the received coded pattern. As such, the preset light signal is the coding pattern. In this case, the depth camera 10 having the light-emitting element 17 and the light control element 110 is a structured light camera.

In one embodiment, as shown in FIG. 4 or FIG. 5, the collector 12 includes a photosensitive array 120 and a readout element 121.

The photosensitive array 120 is electrically coupled to the controller 11, and the photosensitive array 120 includes a plurality of photosensitive pixels 1201 arranged in a matrix form. A photodiode may be disposed in each of the photosensitive pixels 1201. The photosensitive pixel 1201 is configured to receive a reflected light signal reflected by the object to be imaged (hereinafter referred to as "reflected light signal of preset light signal") after the preset light signal from the light-emitting element 17 is incident on the object to be imaged in response to the acquisition signal from the controller 11, and to perform the photoelectric conversion. In this case, after each of the photosensitive pixels 1201 in the photosensitive array 120 receives the reflected light signal, the object to be imaged may be exposed.

Further, the readout element 121 is electrically coupled to the controller 11 and the photosensitive array 120. The readout component 121 is configured to demodulate the reflected optical signal of the preset optical signal in response to the acquisition signal from the controller 11, and obtain the signal difference information between the reflected light signal of the preset light signal and the preset light signal. The readout element may be a front-end signal acquisition circuit mainly including signal conditioning and amplification circuit, etc.

In one embodiment, the preset light signal is the pulse light signal, that is, when the depth camera 10 is a TOF camera. After receiving the acquisition signal from the controller 11, the reading component 121 may demodulate the reflected pulse light signal reflected by the object to be imaged after the pulse light signal from the light-emitting component 17 is incident on the object to be imaged, and the phase difference between the pulse light signal emitted by the light-emitting element 17 and the reflected pulse light signal reflected by the object to be imaged is obtained. In this case, the signal difference information is the phase difference between the pulse light signal and the reflected pulse light signal.

In one embodiment, the preset light signal has a coding pattern, that is, when the depth camera 10 is a structured optical camera. After receiving the acquisition signal from the controller 11, the reading component 121 can demodulate the reflection coding pattern reflected by the object to be imaged after the coding pattern displayed by the light-emitting element 17 is incident on the object to be imaged, and then the distortion variable of each pixel in the reflection coding pattern reflected by the object to be imaged is acquired according to the coding pattern from the light-emitting element 17. In this case, the signal difference information is the distortion variables of the reflected coding pattern.

In one embodiment, as shown in FIG. 4 or FIG. 5, the depth camera 10 further includes a calculator 18. The calculator 18 is electrically coupled to the readout element 121, and the calculator 18 is configured to calculate image depth information obtained by each of the photosensitive pixels 1201 based on the signal difference information output from the readout component 121, thereby generating a depth image based on the image depth information.

It should be noted that the present application does not limit the type of the depth camera 10, and may be, for example, the TOF camera described above, or may also be the above structured optical camera. For convenience of description, the following is an example with a TOF camera.

Based on the configuration of the depth camera 10 described above, the specific configuration of the gesture recognition apparatus 01 will be described in detail by taking the two depth cameras 10 (the depth camera 10_a and the depth camera 10_b) in the gesture recognition apparatus 01 as an example.

Figure 6:
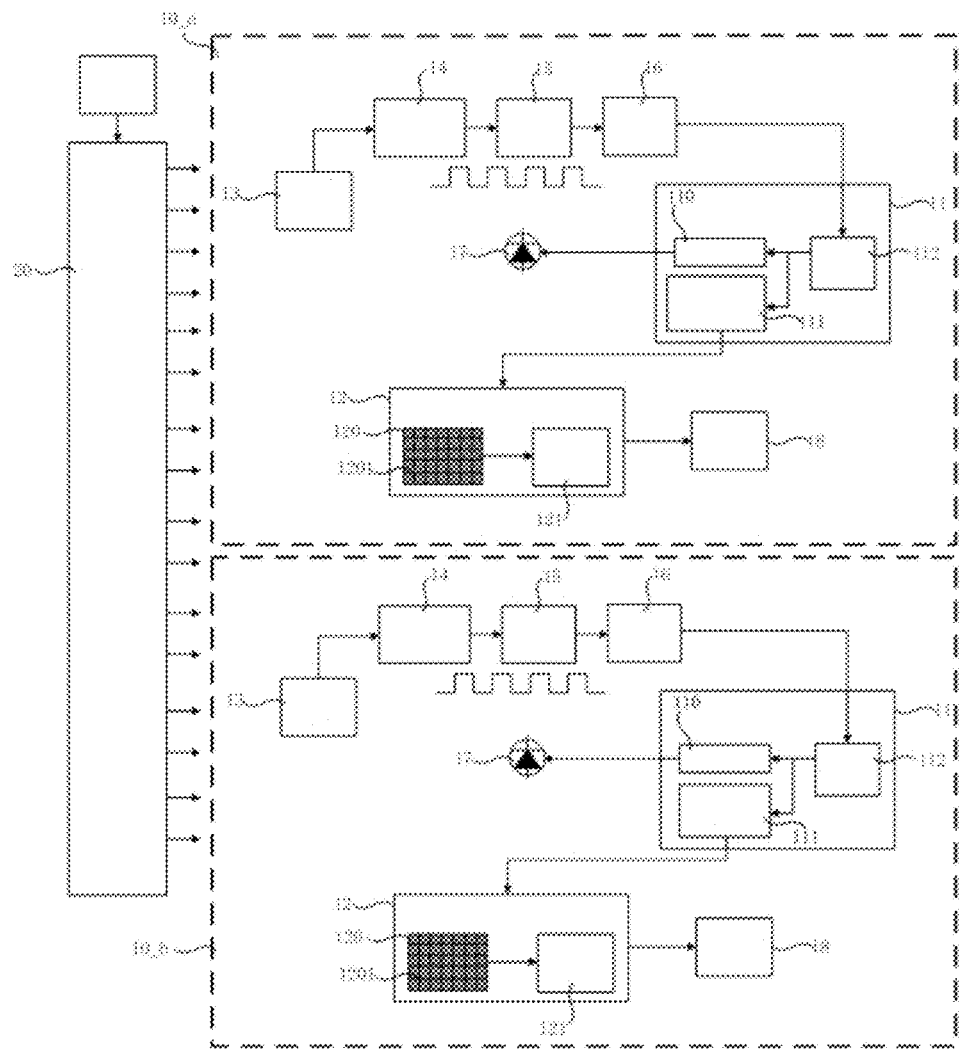
FIG. 6 is a schematic structural view of a depth camera in the gesture recognition apparatus according to one embodiment of the present disclosure.

In one embodiment, as shown in FIG. 6, each depth camera in the gesture recognition apparatus 01 has an optical trigger 13.

In this case, the gesture recognition apparatus 01 further includes a trigger light source 20 for emitting an optical signal to the optical trigger 13 in each depth camera. Wherein, the optical signal may be infrared light. The trigger light source 20 can be connected to an excitation source and emit the infrared light under excitation of the excitation source.

In the embodiment, the optical triggers 13 of the depth camera 10_a and the depth camera 10_b may receive the optical signals emitted by the trigger light source 20, and then send trigger signals to the controller 11 to which they are connected respectively.

In this case, in order to prevent the depth camera 10_a and the depth camera 10_b from interfering from each other during image acquisition, the controllers 11 of the two depth cameras need to emit the light-emitting signals and the acquisition signals at different times.

In one embodiment, in order to achieve the above object, as shown in FIG. 6, the controller 11 further includes a signal generator 111 and a counter 112.

Wherein, the signal generator 111 is configured to generate the acquisition signal. In this case, the photosensitive array 120 and the readout element 121 in the collector 12 may both be electrically coupled to the signal generator 111 to receive the acquisition signal output by the signal generator 111.

The counter 112 is electrically coupled to the signal generator 111. The counter 112 is configured to start counting after receiving the trigger signal, and when the count value reaches a preset threshold, the signal generator 111 is triggered to transmit the acquisition signal.

It should be noted that, as can be seen from the above, the trigger signal provided to the counter 112 can be directly input by the user. Alternatively, as described above, in the case that the depth camera 10 further includes the optical trigger 13, the counter 112 is also electrically coupled to the optical trigger 13. In this case, the optical trigger 13 can output the trigger signal to the counter 112, and the counter 112 is configured to receive the trigger signal from the optical trigger 13. As described above, when the current-voltage converter 14, the filter shaper 15, and the phase compensator 16 are provided between the optical trigger 13 and the controller 11, the phase compensator 16 is connected to the counter 112.

Moreover, in the case where the controller 11 includes a light control element 110, the counter 112 can also be electrically coupled to the light control element 110. In this case, the counter 112 is further configured to start counting after receiving the trigger signal, and when the count value reaches the preset threshold, the light control component 110 is triggered to send the light-emitting signal. As such, the light control component 110 generates the light-emitting signal in response to the trigger signal.

In one embodiment, the preset thresholds of the counters 112 in the different depth cameras are different in value, so that imaging at different times can be achieved.

In one embodiment, the preset thresholds of the counter 112 in the depth camera 10_a may be smaller than the preset thresholds of the counter 112 in the depth camera 10_b. In this case, the imaging process of the depth camera 10_a and the depth camera 10_b at different times are described as follows:

First, for the depth camera 10_a, when the counter 112 in the depth camera 10_a receives the trigger signal from the optical trigger 13, the counter 112 starts counting. For example, when the preset first threshold of the counter 112 in the depth camera 10_a is zero, after the trigger signal is received, the counter 112 immediately triggers the light control component 110 to transmit a light-emitting signal to the light-emitting component 17, and triggers the signal generator 111 to transmit the acquisition signal to the collector 12.

At this time, the pulse light signals emitted by the light-emitting element 17 in the depth camera 10_a irradiate the object to be imaged, and the object to be imaged reflects the pulse light signals, and the reflected pulse light signals are incident on the photosensitive array 120 in the depth camera 10_a. Then, the object is imaged by the photosensitive array 120, and the reflected pulse light signals are demodulated by the reading element 121 so that a phase difference between the pulse light signals emitted by the light-emitting element 17 and the reflected pulse light signals reflected by the object to be imaged is obtained. The calculator 18 in the depth camera 10_a calculates image depth information obtained for each of the photosensitive pixels 1201 based on the phase difference described above, thereby generating a depth image based on the image depth information.

Based on this, the above-described depth camera 10_a completes the entire imaging process.

Next, the depth camera 10_b performs an imaging process, and since the preset second threshold of the counter 112 in the depth camera 10_b is larger, the counter 112 in the depth camera 10_b starts counting after receiving the trigger signal. It may be set that after the depth camera 10_a completes the above-described imaging process, the count value of the counter 112 in the depth camera 10_b reaches its preset second threshold. In this way, when the counter 112 of the depth camera 10_b controls the light control component 110 of the depth camera 10_b to transmit the light-emitting signal, and controls the signal generator 111 to transmit the acquisition signal, the depth camera 10_a has completed the imagine process. At this time, the reflected pulse light signals of the object to be imaged are all pulse light signals from the light-emitting element 17 in the depth camera 10_b. As such, the interference between the two depth cameras can be avoided.

Wherein, the imaging process of the depth camera 10_b is the same as that of the depth camera 10_a described above, and details are not described herein again.

Figure 7:
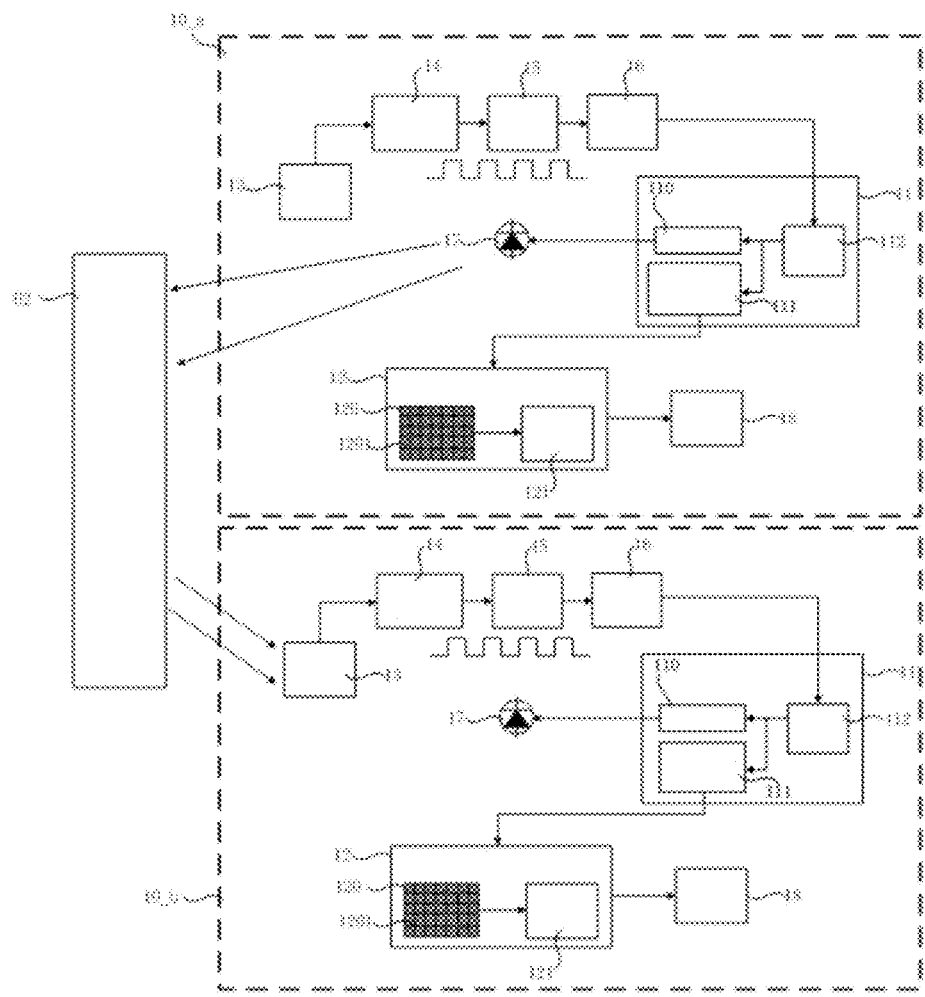
FIG. 7 is a schematic structural diagram of a depth camera in the gesture recognition apparatus according to one embodiment of the present disclosure.

In one embodiment, the specific structure of the gesture recognition apparatus 01 is as shown in FIG. 7. At this time, the gesture recognition apparatus 01 does not contain the trigger light source 20.

In this case, for the depth camera 10_a and the depth camera 10_b, the depth camera 10_a is a main depth camera, and the depth camera 10_b is an accessary depth camera. Based on this, the depth camera 10_a first performs imaging. During the imaging, a light-emitting source provides a light signal to only the optical trigger 13 in the depth camera 10_a, so that the optical trigger 13 outputs a trigger signal to the controller 11, or the user directly provides a trigger signal to the controller 11 in the depth camera 10_a.

Based on this, after receiving the trigger signal, the controller 11 in the depth camera 10_a transmits a light-emitting signal to the light-emitting element 17 through the light-control element 110, and transmits an acquisition signal to the collector 12 through the counter 112 triggering the signal generator 111. After the light-emitting element 17 in the depth camera 10_a receives the light-emitting signal, the pulse light signals emitted from the light-emitting element 17 irradiate the object 02 to be imaged.

At this time, the reflected pulse light signals reflected by the object to be imaged 02 can be received not only by the photosensitive array 120 in the depth camera 10_a but also can be received by the optical trigger 13 as the optical signals in the depth camera 10_b. In this case, the optical trigger 13 of the depth camera 10_b transmits a trigger signal to the counter 112 in the controller 11 of the depth camera 10_b.

As described above, the counter 112 in the depth camera 10_b starts counting after receiving the trigger signal. It may be set that after the depth camera 10_a completes the above-described imaging process, the count value of the counter 112 in the depth camera 10_b reaches its preset threshold value, so that the depth camera 10_a and the depth camera 10_b can be imaged at different times.

Wherein, the imaging processes of the depth camera 10_a and the depth camera 10_b described above is the same as those described above, and details are not described herein again.

Figure 8:
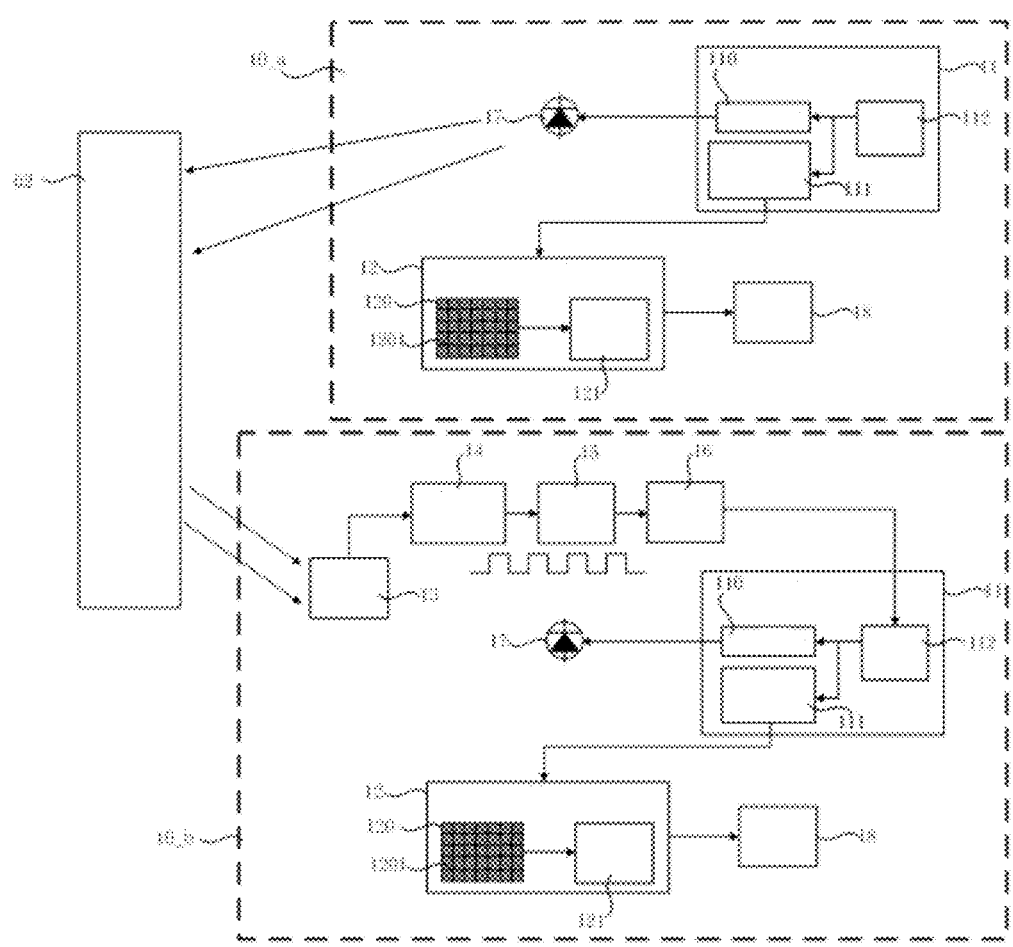
FIG. 8 is a schematic structural diagram of a depth camera in the gesture recognition apparatus according to one embodiment of the present disclosure.

It can be seen from the above that the trigger signal received by the controller 11 in the depth camera 10_a as the main depth camera can be directly input by the user. In one embodiment, the specific structure of the gesture recognition apparatus 01, as shown in FIG. 8, dos not contain the trigger light source 20. Furthermore, in the depth camera 10_a as the first main depth camera, it is unnecessary to provide the optical trigger 13, and the current-voltage converter 14, the filter shaper 15, and the phase compensation apparatus 16 for processing the optical signal from the optical trigger 13.

Figure 9A:
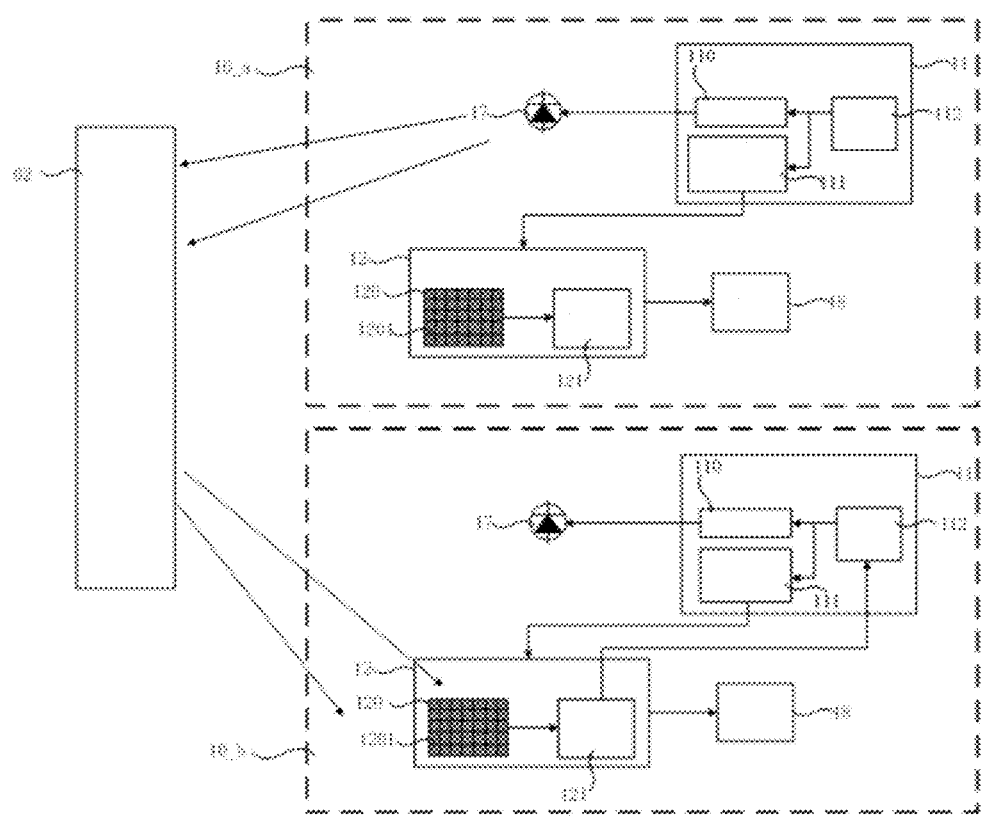
FIG. 9a is a schematic structural diagram of a depth camera in the gesture recognition apparatus according to one embodiment of the present disclosure.

In one embodiment, a specific structure of a gesture recognition apparatus 01 is shown in FIG. 9a. The trigger light source 20 is also not provided in the gesture recognition apparatus 01, and the optical trigger 13 is not provided in any of the depth cameras 10.

In this case, the depth camera 10_a can still be the main depth camera, while the depth camera 10_b can still be the accessary depth camera. At this time, at least the counter 112 in the accessary depth camera 10_b is also electrically coupled to the reading element 121 in the depth camera 10_b.

In this case, at least one of the photosensitive pixels 1201 of the photosensitive array 120 in the depth camera 10_b is also used to perform photoelectrical conversion of the incident light.

The readout element 121 in the depth camera 10_b is further configured to issue a trigger signal to the counter 112 based on the electrical signal output from the photosensitive pixel 1201.

In this embodiment, the imaging processes of the depth camera 10_a and the depth camera 10_b are as follows: first, the depth camera 10_a performs the imaging process, and the user inputs a trigger signal to the controller 11 in the depth camera 10_a so that the controller 11 controls the light control element 110 to transmit the light-emitting signal to the light emitting-element 17, and controls the counter 112 to trigger the signal generator 111 to transmit the acquisition signal to the collector 12.

In this case, the photosensitive array 120 in the depth camera 10_b is in a normal open state. At this time, when the light-emitting element 17 in the depth camera 10_a emits pulse light signals, after the light pulse signals irradiate the object 02 to be imaged, the reflected pulse light signals reflected by the object to be imaged 02 can be received not only by the photosensitive array 120 in the depth camera 10_a, but also as an optical signal by at least one photosensitive pixel 1201 of the photosensitive array 120 in the depth camera 10_b.

In this case, the photosensitive pixel 1201 of the depth camera 10_b performs photoelectrical conversion of the received optical signal. After the readout element 121 in the depth camera 10_b receive the electrical signal output from the photosensitive pixel 1201, the readout element 121 sends a trigger signal to the counter 112 of the depth camera 10_b.

As described above, the counter 112 in the depth camera 10_b starts counting after receiving the trigger signal. It may be set that after the depth camera 10_a completes the above-described imaging process, the count value of the counter 112 in the depth camera 10_b reaches its preset threshold value, so that the depth camera 10_a and the depth camera 10_b can perform the imaging processes at different times.

It should be noted that the above description is merely an example in which the gesture recognition apparatus 01 includes two depth cameras. When the gesture recognition apparatus includes a plurality of cameras, the imaging process is similar as described above. In addition, when a plurality of, for example, at least three, depth cameras are divided into a main depth cameras and accessary depth cameras, a depth camera may function as an accessary depth camera of a previous depth camera and a main depth camera of a later depth camera.

In one embodiment, in the case that the gesture recognition apparatus 01 includes at least three depth cameras 10, the gesture recognition apparatus 01 may also be any combination of the various schemes shown in FIG. 6, FIG. 7, FIG. 8 and FIG. 9a above.

Figure 9B:
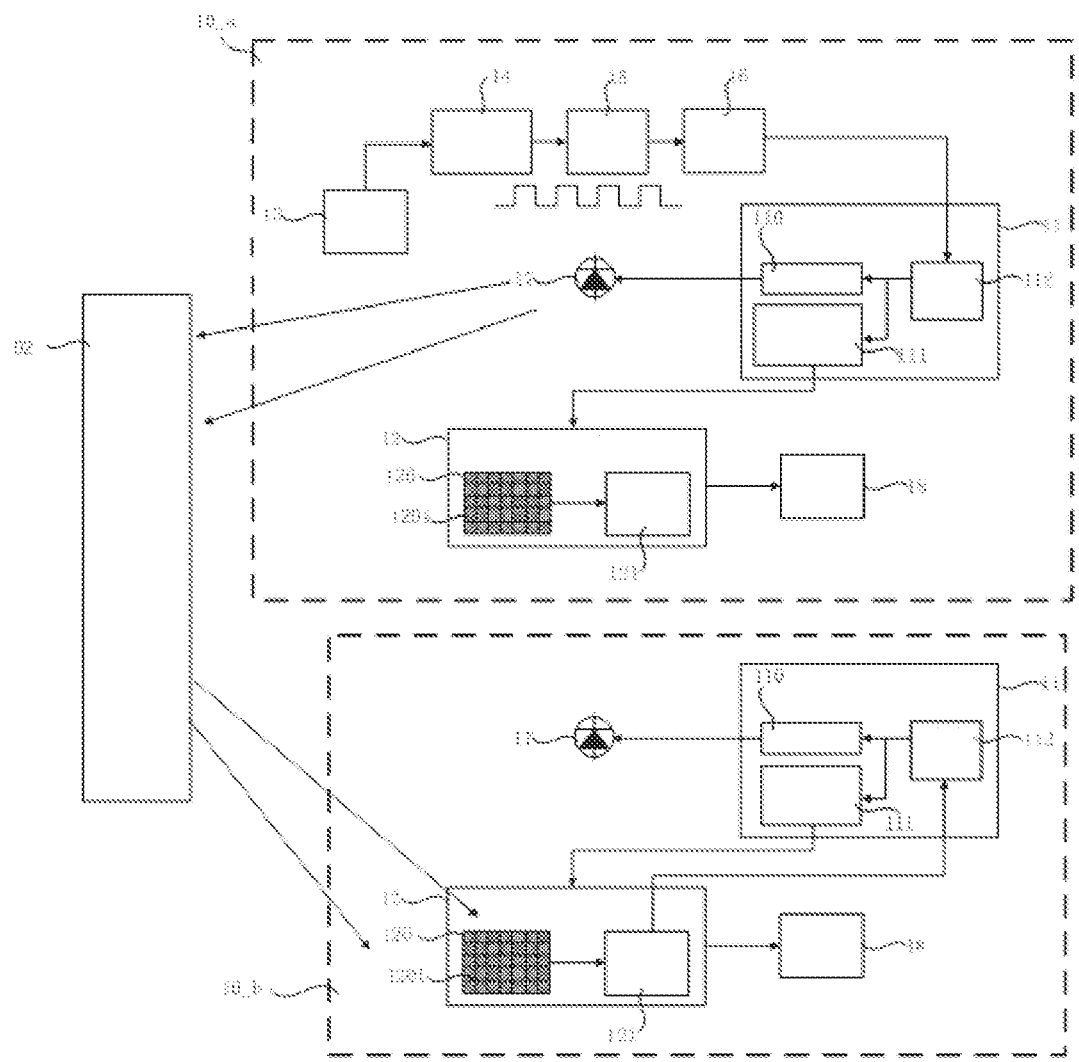
FIG. 9b is a schematic structural diagram of a depth camera in the gesture recognition apparatus according to one embodiment of the present disclosure.

In one embodiment, a specific structure of the gesture recognition apparatus 01 is shown in FIG. 9b. The gesture recognition apparatus 01 has at least one depth camera 10_a provided with an optical trigger 13 as the main depth camera, and a depth camera 10_b without an optical trigger 13 as the accessary depth camera.

In this case, during the imaging, an light-emitting source can be used to provide an optical signal to the optical trigger 13 in the depth camera 10_a so that the optical trigger 13 outputs a trigger signal to the controller 11 in the depth camera 10_a. At this time, as described above, the pulse light signals emitted from the light-emitting element 17 in the depth camera 10_a irradiate the object 02 to be imaged.

At this time, the reflected pulse light signals reflected by the object 02 to be imaged can be received not only by the photosensitive array 120 in the depth camera 10_a, but also as an optical signal by at least one photosensitive pixel 1201 of the photosensitive arrays 120 in the depth camera 10_b. In this case, the readout element 121 in the depth camera 10_b receives the electrical signal output from the photosensitive pixel 1201, and then issues a trigger signal to the counter 112 of the depth camera 10_b.

The imaging processes of the depth camera 10_a and the depth camera 10_b are the same as those described above, and will not be described again here.

In addition, the gesture recognition apparatus 01 that are obtained through any of the combination of various schemes shown in FIG. 6, FIG. 7, FIG. 8, and FIG. 9a are in the scope of the present invention and not described herein again.

In some embodiments of the present disclosure, the plurality of depth cameras 10 in the gesture recognition apparatus 01 are controlled to acquire the gesture at different times by the optical signals. Furthermore, the circuit structures of the respective depth cameras 10 are separately arranged without being physically electrically connected, thereby avoiding the constraints of physically connecting the plurality of depth cameras 10. As such, the plurality of depth cameras 10 is independent from one another, thereby reducing mutual coupling effect and signal noise.

Another example of the present disclosure provides a display apparatus. The display apparatus includes a gesture recognition apparatus 01 described above according to one embodiment of the present disclosure. The display apparatus can be any product or component having a display function such as a display, a television, a digital photo frame, a mobile phone or a tablet. The display apparatus has the same technical advantage as the gesture recognition apparatus 01 provided by the foregoing embodiments, and details are not described herein again.

Figure 10A:
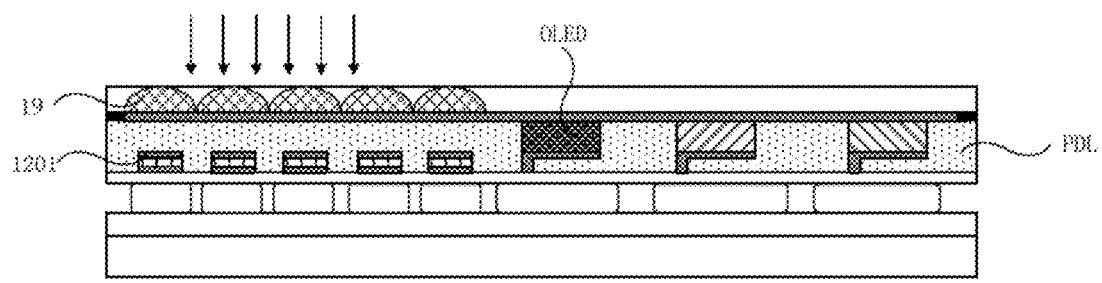
FIG. 10a is a schematic partial structural diagram of a display apparatus according to one embodiment of the present application.

In addition, the displays apparatus may be a liquid crystal display (LCD) display apparatus or an organic light-emitting diode (OLED) display apparatus. When the display apparatus is an OLED display apparatus, some structures of the depth camera 10 in the gesture recognition apparatus 01 such as the photosensitive array 120 and the prism 19 may be integrated inside the OLED display apparatus, as shown in FIG. 10a.

In one embodiment, a recess for accommodating the OLED apparatus is formed in a Pixel Defined Layer (PDL) of the OLED display apparatus. At the same time, in the non-display area of the OLED display apparatus, that is, at the positions where the depth cameras 10 are integrated, recesses for accommodating the photodiodes in the photosensitive pixels 1201 of the photosensitive array 120 are formed. Then, prisms 19 are disposed at the light emitting side of the photosensitive pixels 1201.

Figure 10B:
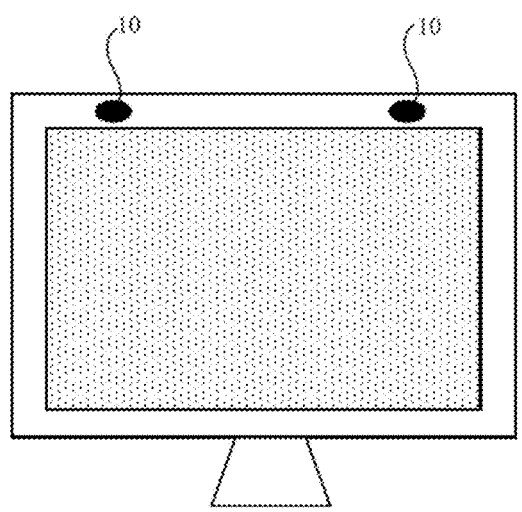
FIG. 10b is a schematic partial structural diagram of a display apparatus according to one embodiment of the present disclosure.

In one embodiment, as, shown in FIG. 10b, the plurality of depth cameras 10 in the gesture recognition apparatus 01 may be disposed on front frame of the display panel in the display apparatus.

Figure 10C:
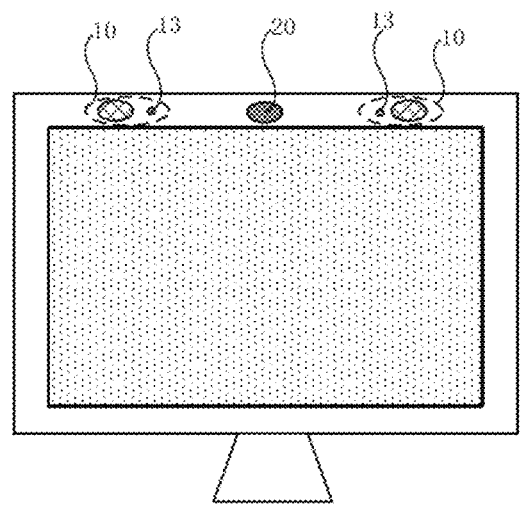
FIG. 10c is a schematic partial structural diagram of a display apparatus according to one embodiment of the present disclosure.

In one embodiment, as shown in FIG. 10c, the depth cameras 10 of the gesture recognition apparatus 01 are provided with the above-described optical triggers 13 and the above-described trigger light source 20. Both the trigger light source 20 and the optical trigger 13 can be disposed on the front frame of the display panel in the display apparatus. In some embodiments, the trigger light source 20 can be located between two depth cameras 10.

In one embodiment, as the light emitted by the trigger light source 20 irradiates the object (including the object to be imaged), diffuse reflection occurs. The optical triggers 13 receive the light from the diffuse reflection and transmit a trigger signal as an optical signal to the connected controller 11 respectively.

In one embodiment, when the non-display area of the display panel in the display apparatus is small, the trigger light source 20 can also be disposed independently from the display panel. At this time, the trigger light source 20 can be fixed to the front frame of the display panel by a fixing apparatus such as a jig.

Figure 11:
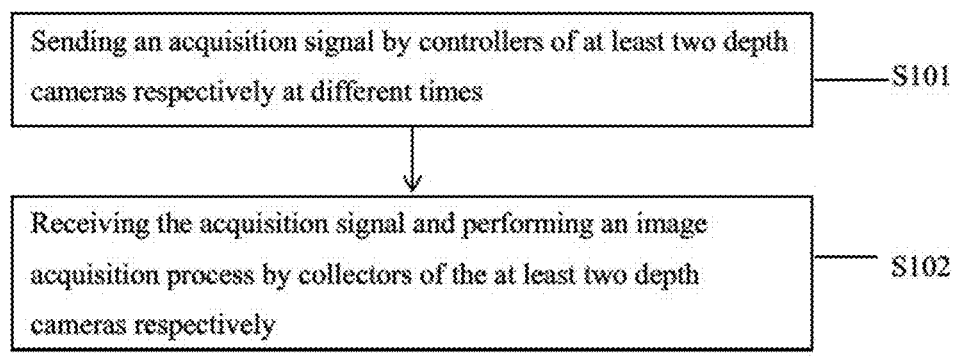
FIG. 11 is a flowchart of a method for controlling a gesture recognition apparatus according to an embodiment of the present application.

Another embodiment of the present disclosure provides a method for controlling a gesture recognition apparatuses 01 according to one embodiment of the present disclosure. As shown in FIG. 11, the control method includes the following:

In step S101, controllers 11 of at least two depth cameras 10 transmit acquisition signals respectively at different times.

In step S102, the collectors 12 in the depth cameras 10 receive the acquisition signals and perform imaging processes respectively.

The control method of the gesture recognition apparatus 01 has the same technical benefits as the gesture recognition apparatus provided in the foregoing embodiments, and details are not described herein again.

Hereinafter, taking the gesture recognition apparatus 01 including two depth cameras 10 (the depth camera 10_a and the depth camera 10_b) as an example, the exemplified control methods of the gesture recognition apparatuses 01 having different configurations are described in detail below respectively.

Figure 12:
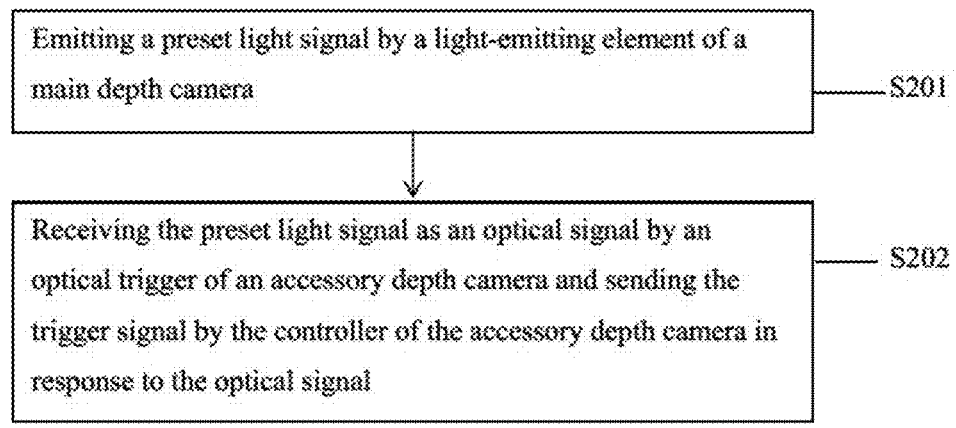
FIG. 12 is a flowchart of a method for controlling a gesture recognition apparatus according to one embodiment of the present disclosure.

In one embodiment, in the structure of the gesture recognition apparatus 01 described above, as shown in FIG. 7 or FIG. 8, that is, the depth camera 10_a is a main depth camera, and the depth camera 10_b is an accessary depth camera, and each depth camera includes a light-emitting element 17. At least the accessary depth camera 10_b includes the optical trigger 13. the control method, as shown in FIG. 12, further includes the following:

In step S201, the light-emitting element 17 of the main depth camera 10_a emits a preset light signal such as a pulse light signal.

In one embodiment, when the main depth camera 10_a includes the above-mentioned optical trigger 13, a light source can be used to provide a light signal only to the optical trigger 13 in the depth camera 10_a, and the optical trigger 13 outputs a trigger signal to the controller 11. Alternatively, when the main depth camera 10_a does not include the above-described optical trigger 13, the user directly supplies a trigger signal to the controller 11 in the main depth camera 10_a.

Based on this, after receiving the trigger signal, the controller 11 in the main depth camera 10_a transmits a light-emitting signal to the light-emitting element 17 through the light-control element 110, and the light-emitting element 17 emits a preset light signal such as a pulse light signal in response to the light-emitting signal.

It should be noted that the above step S201 may be performed before the step of transmitting the acquisition signal by the main depth camera 10_a, or after the step of transmitting the acquisition signal by the main depth camera 10_a, or simultaneously with the step of transmitting the acquisition signal by the main depth camera 10a.

In step S202, the optical trigger 13 of the depth camera 10_b receive a preset light signal as an optical signal, and sends a trigger signal to the controller 11 of the depth camera 10_b in response to the optical signal.

Based on this, the above steps S101 and S102 include the following:

First, the controller 11 of the main depth camera 10_a transmits an acquisition signal, and the collector 12 of the main depth camera 10_a performs an image acquisition operation.

Next, the controller 11 in the accessary depth camera 10_b generates an acquisition signal based on the trigger signal transmitted by the optical trigger 13, and after the image acquisition process is completed by the collector 12 of the main depth camera 10_a, the controller 11 in the accessary depth camera 10_b transmits the above acquisition signal again.

Then, the collector 12 of the accessary depth camera 10_b receives the acquisition signal from the controller 11 of the accessary depth camera 10_b and performs an image acquisition process.

Wherein, when the controller 11 of any one of the depth cameras includes the light control element 110, the counter 112, and the signal generator 111, and the collector 12 includes the photosensitive array 120 and the readout element 121, the depth camera transmits the light-emitting signal and the acquisition signal. The processes of emitting light in response to the light-emitting signal and acquiring the image in response to the acquisition signal are similar as those described above, and will not be described herein.

As can be seen from the above, when the image is acquired by the accessary depth camera 10_b, the main depth camera 10_a has completed the image acquisition process. As such, the imaging processes of the two depth cameras are not disturbed.

Figure 13:
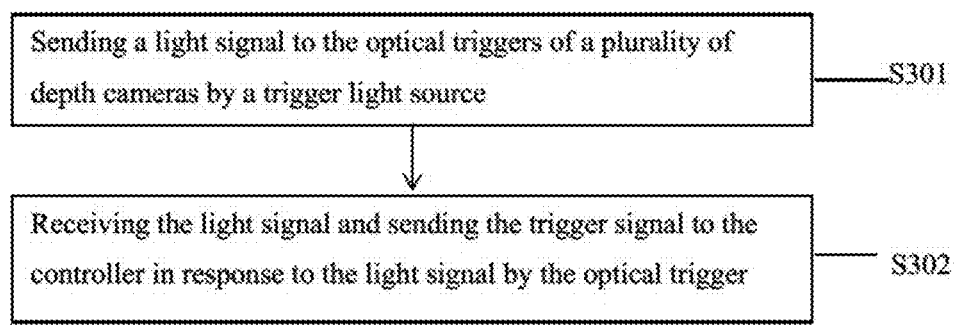
FIG. 13 is a flowchart of a method for controlling a gesture recognition apparatus according to one embodiment of the present application.

In another embodiment, in the structure of the gesture recognition apparatus 01 as shown in FIG. 6, each of the depth cameras (the depth camera 10_a and the depth camera 10_b) includes a controller 11, a collector 12, and an optical trigger 13. The gesture recognition apparatus 01 further includes the triggering light source 20. Before the step S101, the method, as shown in FIG. 13, further includes the following:

In step S301, the trigger light source 20 emits an optical signal to the optical triggers 13 of the plurality of depth cameras, that is, the depth camera 10_a and the depth camera 10_b.

In step S302, the optical triggers 13 receive the optical signal, and send a trigger signal to the controller 11 in response to the optical signal.

Based on this, the above S101 includes the following:

First, the controller 11 of each depth camera 10 generates an acquisition signal in response to the trigger signal from the optical trigger 13.

Then, the controllers 11 of the plurality of depth cameras 10 sequentially transmit acquisition signals to the collectors 12 respectively.

In one embodiment, the controller of each of the depth cameras 10 includes a light control element 110, a counter 112, and a signal generator 111. After the counter 112 in the depth camera 10_a receives a trigger signal from the optical trigger 13, and the preset threshold of the counter 112 in the depth camera 10_a is zero, the counter 112 immediately triggers the light control component 110 to send a light-emitting signal to the light-emitting component 17 and triggers the signal generator 111 to send an acquisition signal to the collector 12. Then, the collector 12 in the depth camera 10_a performs an image acquisition process.

Next, the counter 112 in the depth camera 10_b starts counting after receiving the trigger signal. It may be set that after the depth camera 10_a completes the above-described imaging process, the count value of the counter 112 in the depth camera 10_b reaches its preset threshold. In this way, when the counter 112 controls the light control component 110 of the depth camera 10_b to transmit the light-emitting signal, and controls the signal generator 111 to transmit the acquisition signal, the depth camera 10_a has completed the imaging process. The reflected pulse signals reflected by the object to be imaged at this time are all pulse light signals from the light-emitting elements 17 in the depth camera 10_b. As such, interference between the two depth cameras can be avoided.

Figure 14:
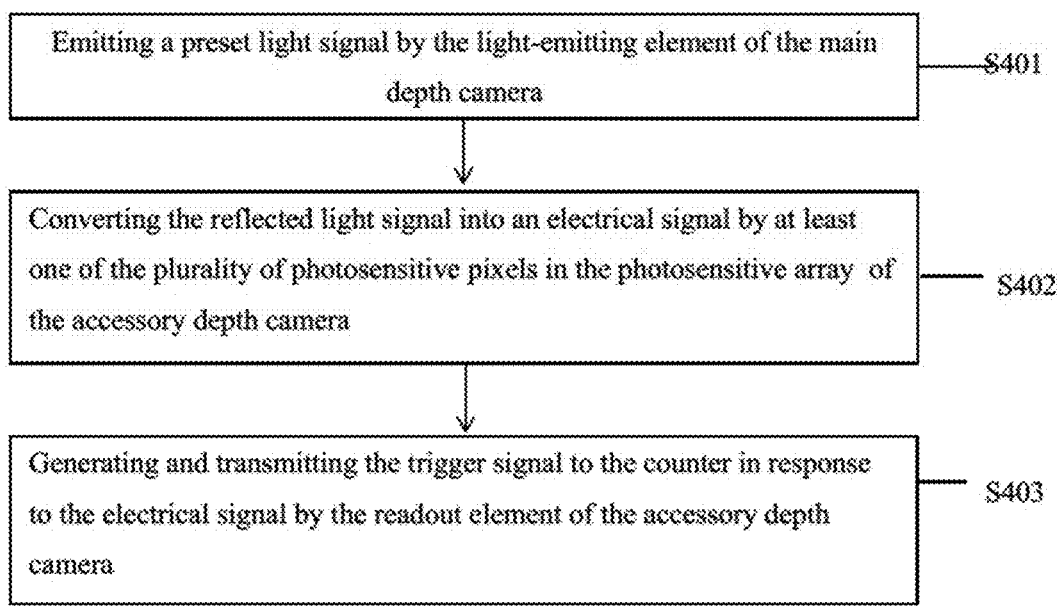
FIG. 14 is a flowchart of a method for controlling a gesture recognition apparatus according to one embodiment of the present application.

In another embodiment, in the structure of the gesture recognition apparatus 01 as shown in FIG. 9a, the depth camera 10_a is a main depth camera, the depth camera 10_b is an accessary depth camera. Each depth camera includes a light-emitting element 17 and a collector 12. The collector 12 includes a photosensitive array 120 and a readout element 121. The above method, as shown in FIG. 14, further includes the following:

In step S401, the light-emitting element 17 of the main depth camera 10_a emits a preset optical signal, such as an pulse light signal.

It should be noted that the above step S401 may be performed before the step of transmitting the acquisition signal by the main depth camera 10_a, or after the step of transmitting the acquisition signal by the main depth camera 10_a, or simultaneously with the step of transmitting the acquisition signal by the main depth camera 10_a.

In step S402, at least one photosensitive pixel 1201 in the photosensitive array 120 of the accessary depth camera 10_b performs photoelectric conversion on the incident preset light signal.

In step S403, the readout element 121 from the accessary depth camera 10_b sends a trigger signal to the controller 11 of the accessary depth camera 10_b based on the electrical signal output from the photosensitive pixel 1201.

Furthermore, the above steps S101 and S102 include the following:

First, the controller 11 of the main depth camera 10_a transmits an acquisition signal, and the collector 12 of the main depth camera 10_a performs an image acquisition process.

Next, an acquisition signal is generated by the collector 12 in the accessary depth camera 10_b in response to the trigger signal from the readout element 121. After the image acquisition process is completed by the collector 12 of the main depth camera 10_a, the controller 11 of the accessary depth camera 10_b then send the above acquisition signal again.

In one embodiment, at least the controller 11 of the accessary depth camera 10_b includes the counter 112 and the signal generator 111. The step of transmitting the triggering signal from the readout element 121 of the accessary depth camera 10_b to the controller 11 of the accessary depth camera 10_b includes the following:

The photosensitive array 120 in the accessary depth camera 10_b is in a normal open state. At this time, the light-emitting element 17 in the main depth camera 10_a emits a pulse light signal. After the pulse light signal irradiate the object to be imaged 02, the reflected pulse light signal reflected by the object to be imaged 02 is received as an optical signal by at least one photosensitive pixel 1201 of the photosensitive arrays 120 in the accessary depth camera 10_b. In this case, the photosensitive pixel 1201 of the accessary depth camera 10_b performs photoelectrical conversion of the received light signal. After the readout element 121 in the accessary depth camera 10_b receives the electrical signal from the photosensitive pixel 1201, the readout element 121 in the accessary depth camera 10_b sends a trigger signal to the counter 112 of the accessary depth camera 10_b.

Next, the collector 12 of the accessary depth camera 10_b receives an acquisition signal transmitted from the controller 11 of the accessary depth camera 10_b, and performs an image acquisition process.

Wherein, after the collector 12 of the main depth camera 10_a completes the image acquisition process, the step of transmitting the acquisition signal by the controller 11 of the accessary depth camera 10_b includes the following:

After receiving the trigger signal from the reading component 121, the counter of the accessary depth camera 10_b starts counting. After the collector 12 of the main depth camera 10_a completes the imaging process, the counter value of the counter 121 of the accessary depth camera 10_b reaches the preset threshold value, and the counter 112 triggers transmission of the acquisition signal from the signal generator 111 of the accessary depth camera 10_b to the collector 12 of the accessary depth camera 10_b.

The main depth camera 10_a and the accessary depth camera 10_b transmit the light-emitting signal and the acquisition signal. The respective light-emitting elements accordingly illuminate. The processes of acquiring the image by the main depth camera 10_a and the accessary depth camera 10_b respectively in response to the acquisition signal are similar as those described above, and details are not repeated herein.

A person of ordinary skill in the art can understand that all or part of the steps of implementing the foregoing method embodiments may be implemented by hardware related to programs. The foregoing programs may be stored in a computer readable storage medium. When the program is executed, the foregoing steps including the steps of the foregoing method embodiments are performed. The foregoing storage medium may include a medium that can store program codes, such as a ROM, a RAM, a magnetic disk, or an optical disk.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:
1. A gesture recognition apparatus, comprising:
a gesture processor; and
a plurality of depth cameras connecting to the gesture processor, each of the plurality of the depth cameras comprising a controller and a collector,
wherein the controller is configured to generate and transmit an acquisition signal to the collector in response to a trigger signal;
the collector is configured to receive the acquisition signal and perform an image acquisition process in response to the acquisition signal;
each of the plurality of depth cameras further comprises a light-emitting element; and the controller comprises a light control element, the light control element is configured to generate a light-emitting signal in response to the trigger signal, and the light-emitting element is electrically coupled to the light control element, and the light-emitting element is configured to emit a light signal in response to the light-emitting signal and the light signal being reflected by an object to be imaged to produce a reflected light signal;

the controller further comprises a counter, the counter is electrically coupled to the light control element and the counter is configured to start counting after receiving the trigger signal, and trigger the light control component to transmit the light-emitting signal to the light-emitting element when a count value of the counter reaches a first threshold;

the controller further comprises a signal generator, the counter is further electrically coupled to the signal generator, the signal generator is configured to generate the acquisition signal;

the counter is further configured to trigger the signal generator to transmit the acquisition signal to the collector when the count value of the counter reaches the first threshold;

the first threshold in each of the plurality of depth cameras is different, and for any two adjacent depth cameras, the counter in one of the two adjacent depth cameras reaches the first threshold after the other one of the two adjacent depth cameras completes the image acquisition process.

2. The gesture recognition apparatus according to claim 1, wherein at least one of the plurality of depth cameras further comprises an optical trigger, the optical trigger is electrically coupled to the controller, and the optical trigger is configured to generate and transmit the trigger signal to the controller in response to an optical signal.

3. The gesture recognition apparatus according to claim 2, wherein the optical trigger comprises a photoelectric converter; and the at least one of the plurality of depth cameras having the optical trigger further comprises a current-voltage converter;

the current-voltage converter is electrically coupled to the optical trigger and the controller, and the current-voltage converter is configured to convert a current signal from the photoelectric converter into a voltage signal and transmit the voltage signal to the controller.

4. The gesture recognition apparatus according to claim 3, wherein the at least one of the plurality of depth cameras having the optical trigger further comprises a filter shaper and a phase compensator;

the filter shaper is electrically coupled to the current-voltage converter and the filter shaper is configured to filter the voltage signal from the current-voltage converter; and the phase compensator is electrically coupled to the filter shaper and the controller, and the phase compensator is configured to compensate a phase of the voltage signal from the filter shaper to obtain a compensated voltage signal and output the compensated voltage signal to the controller.

5. The gesture recognition apparatus according to claim 1, wherein the collector comprises a photosensitive array and a readout element; the photosensitive array comprising a plurality of photosensitive pixels arranged in a matrix;

wherein the photosensitive array is electrically coupled to the controller and the plurality of photosensitive pixels are configured to receive the reflected light signal in response to the acquisition signal and perform photoelectric conversion of the reflected optical signal; and wherein the readout element is electrically coupled to the controller and the photosensitive array, and the readout element is configured to demodulate the reflected light signal in response to the acquisition signal, and acquire signal difference information between the light signal and the reflected light signal.

6. The gesture recognition apparatus according to claim 5, wherein each of the plurality of the depth cameras further comprises a calculator; the calculator is electrically coupled to the readout element, and the calculator is configured to calculate image depth information obtained by each of the photosensitive pixels based on the signal difference information from the readout element.

7. The gesture recognition apparatus according to claim 6, wherein each of the plurality of depth cameras comprises the optical trigger.

8. The gesture recognition apparatus according to claim 7, further comprising a trigger light source, wherein the trigger lighter source is configured to emit the optical signal to the optical trigger in each of the plurality of depth cameras.

9. The gesture recognition apparatus according to claim 6, wherein the optical trigger of at least one of the plurality of depth cameras receives the reflected light signal and generates and transmits the trigger signal to the controller in response to the reflected light signal.

10. The gesture recognition apparatus according to claim 6, wherein the counter is further electrically coupled to the readout element;

at least one of the plurality of photosensitive pixels in the photosensitive array is configured to receive the reflected light signal, and convert the reflected light signal into an electrical signal; and the readout element is configured to receive the electrical signal, and generate and transmit the trigger signal to the counter in response to the electrical signal.

11. The gesture recognition apparatus according to claim 10, wherein the light-emitting element comprises a light emitting diode, the light control element comprises a light modulator, and the light-emitting element is configured to emit a pulse light signal in response to the light-emitting signal.

12. The gesture recognition apparatus according to claim 10, wherein the light-emitting element comprises a plurality of light emitting diodes arranged in an array, the light control element comprises a coding pattern driving element, and the light-emitting element is configured to emit a coding pattern signal in response to the light-emitting signal.

13. The gesture recognition apparatus according to claim 1, wherein the controller in at least one of the plurality of depth cameras is configured to receive the trigger signal input by a user.

14. The gesture recognition apparatus according to claim 13, further comprising a light-emitting element, wherein the controller is configured to generate and transmit a light-emitting signal to the light-emitting element in response to the trigger signal, and the light-emitting element is configured to emit a light signal in response to the light-emitting signal and the light signal being reflected by an object to be imaged to produce a reflected light signal.

15. The gesture recognition apparatus according to claim 14, wherein the collector comprises a photosensitive array comprising a plurality of photosensitive pixels arranged in a matrix and a readout element, the readout element is electrically coupled to the counter;

wherein at least one of the plurality of photosensitive pixels in the photosensitive array is configured to receive the reflected light signal, and convert the reflected light signal into an electrical signal; and wherein the readout element is configured to receive the electrical signal, and generate and transmit the trigger signal to the counter in response to the electrical signal.

16. A display apparatus comprising the gesture recognition apparatus according to claim 1.

\* \* \* \* \*